United States Patent
Wan et al.

(10) Patent No.: US 11,530,465 B2
(45) Date of Patent: Dec. 20, 2022

(54) METHOD FOR DECOMPOSING MIXED WOLFRAMITE AND SCHEELITE ORE IN ALKALINE SYSTEM

(71) Applicant: Jiangxi University of Science and Technology, Jiangxi (CN)

(72) Inventors: Linsheng Wan, Jiangxi (CN); Liang Yang, Jiangxi (CN); XinYing Zhang, Jiangxi (CN); Xiang Xue, Jiangxi (CN)

(73) Assignee: Jiangxi University of Science and Technology, Ganzhou (CN)

( * ) Notice: Subject to any disclaimer, the term of this patent is extended or adjusted under 35 U.S.C. 154(b) by 484 days.

(21) Appl. No.: 16/714,757

(22) Filed: Dec. 15, 2019

(65) Prior Publication Data

US 2020/0190626 A1 Jun. 18, 2020

(30) Foreign Application Priority Data

Dec. 17, 2018 (CN) .......................... 201811538772.5

(51) Int. Cl.
*C22B 34/36* (2006.01)
*C22B 1/24* (2006.01)
*C22B 3/12* (2006.01)

(52) U.S. Cl.
CPC ................ *C22B 34/36* (2013.01); *C22B 1/24* (2013.01); *C22B 3/12* (2013.01)

(58) Field of Classification Search
CPC .............. C22B 34/36; C22B 1/24; C22B 3/12
See application file for complete search history.

(56) References Cited

U.S. PATENT DOCUMENTS

| | | | | |
|---|---|---|---|---|
| 4,320,096 A | * | 3/1982 | Queneau | C01G 41/00 423/58 |
| 4,328,190 A | * | 5/1982 | Beckstead | C22B 3/282 423/54 |
| 4,508,701 A | * | 4/1985 | Goddard | C01G 41/00 423/58 |
| 4,629,503 A | * | 12/1986 | Fruchter | C01G 41/02 423/58 |

FOREIGN PATENT DOCUMENTS

| | | | | |
|---|---|---|---|---|
| CN | 1307140 A | * | 8/2001 | |
| CN | 105586487 A | | 5/2016 | |
| CN | 105969977 A | * | 9/2016 | |
| CN | 106636632 A | | 5/2017 | |
| CN | 106282608 B | | 9/2018 | |
| CN | 108754123 A | * | 11/2018 | ............... C22B 1/02 |

* cited by examiner

*Primary Examiner* — Melissa S Swain

(57) ABSTRACT

The present invention discloses a method for effectively decomposing mixed wolframite and scheelite ore in an alkaline system, specifically comprising steps of: grinding mixed wolframite and scheelite ore, putting in an autoclave, adding an appropriate amount of water, and then adding sodium phosphate, sodium hydroxide and calcium fluoride for decomposition, and treating by solid-liquid separation to obtain crude sodium tungstate solution. The present invention has the advantage that the high-efficiency decomposition of the mixed wolframite and scheelite ore can be realized with low consumption of leaching agents. By this method, the mixed wolframite and scheelite ore can be directly treated by an existing tungsten smelting autoclave, with low leaching cost, high decomposition rate and easy industrial application.

6 Claims, No Drawings

METHOD FOR DECOMPOSING MIXED WOLFRAMITE AND SCHEELITE ORE IN ALKALINE SYSTEM

CROSS-REFERENCE TO RELATED APPLICATIONS

This application claims the benefit of priority from Chinese Patent Application No. 201811538772.5, filed on Dec. 17, 2018. The content of the aforementioned application, including any intervening amendments thereto, is incorporated herein by reference in its entirety.

TECHNICAL FIELD

The present invention relates to the technical field of smelting and separation of tungsten ore, and in particular to a method for decomposing mixed wolframite and scheelite ore in an alkaline system.

BACKGROUND OF THE PRESENT INVENTION

Rich in tungsten resource, China ranks first in the tungsten resource reserves in the world. For a long time, tungsten smelting enterprises in China have mostly used wolframite concentrate or scheelite concentrate as raw materials for production. After nearly 30 years of high-speed mining, wolframite concentrate resources that are easy for dressing and smelting are being gradually depleted, and the scheelite concentrate resource reserves are also insufficient. At present, the proved reserves of scheelite and wolframite paragenic ore in China gradually increase. Tungsten smelting enterprises have to use mixed wolframite and scheelite ore and low-grade complex scheelite as raw materials. For example, in China, the oversized Shizhuyuan tungsten deposit has a reserve of 747,000 tons, with the ratio of the wolframite to scheelite being 3:7; and, the Shenlow-Kine tungsten deposit in Western Fujian has a reserve of 300,000 tons, with the ratio of wolframite to scheelite being about 1:1. By existing ore dressing methods, it is very difficult to separate wolframite concentrate and scheelite concentrate from the mixed wolframite and scheelite ore, and the tungsten recovery rate is low. Therefore, developing a smelting process for efficiently treating mixed wolframite and scheelite ore is very important to the improvement of the utilization of tungsten resources in China.

At present, smelting enterprises in China mostly use sodium hydroxide to leach the mixed wolframite and scheelite ore at a high pressure, but this process will require high consumption of sodium hydroxide. For the mixed wolframite and scheelite concentrate, the consumption of sodium hydroxide is 2 to 5 times of the required theoretical amount; and, for the medium- or low-grade mixed wolframite and scheelite ore, the consumption of sodium hydroxide required is larger. The leaching cost is very high. Tungsten smelting enterprises in other countries mostly use sodium carbonate to decompose the mixed wolframite and scheelite ore at a high pressure, also resulting in high consumption of the leaching agent, i.e., sodium carbonate. During the treatment of wolframite/scheelite concentrate or middling, the consumption of sodium carbonate is 3 to 5 times of the theoretical amount; and, during the treatment of low-grade ore, the consumption of sodium carbonate is about 6 times of the theoretical amount. In addition, since the decomposition using sodium carbonate is performed at a high temperature and a high pressure, the reactor is prone to caustic embrittlement, and it is disadvantageous for safe production. In order to solve the problems of high consumption of the leaching agent and high leaching cost in the decomposition of the mixed wolframite and scheelite ore, scholars both in China and other countries have conducted extensive research and have proposed some feasible methods. For example, Patent No. CN105586487A has proposed that the mixed wolframite and scheelite ore is decomposed at a high pressure by sodium hydroxide and a soluble carbonate. This method is actually a joint decomposition process using sodium hydroxide and sodium carbonate, and the consumption of the leaching agent is still high. Patent No. ZL106282608B has proposed that wolframite is decomposed by adding the mixed wolframite and scheelite ore and calcium hydroxide in sodium hydroxide solution and scheelite in the decomposed residue is leached out by mixed sulfuric acid-phosphoric acid solution. This process can realize the decomposition of the mixed wolframite and scheelite ore at low cost. However, the overall extraction of tungsten is realized by two leaching steps, so the operation process is relatively complicated. Patent No. CN106636632A has proposed a method for decomposing mixed wolframite and scheelite ore in an alkaline system by a soluble phytate. The insoluble organic complex calcium salt generated by the reaction enters the residue, and tungsten enters the leachate in the form of tungstate. The residue is dissolved by sulfuric acid, adsorbed with phytate ions by ion exchange and then desorbed by a sodium hydroxide solution. The desorbed solution is returned to the leaching process of the mixed wolframite and scheelite ore. In this way, the leaching cost is greatly reduced.

In fact, it is easy to treat wolframite in the mixed wolframite and scheelite ore, and better decomposition effect can be achieved by leaching using sodium hydroxide. However, the sodium hydroxide works not so well in the decomposition of scheelite. Therefore, if the agents for decomposing wolframite and scheelite can be reasonably coordinated, the high-efficiency decomposition of the mixed wolframite and scheelite ore can be realized. Based on this, the present invention provides a novel method for decomposing mixed wolframite and scheelite ore, which uses sodium phosphate, sodium hydroxide and calcium fluoride as a novel mixed decomposition agent to decompose wolframite and scheelite, thereby achieving the purpose of efficiently decomposing the mixed wolframite and scheelite ore by one step.

SUMMARY OF THE PRESENT INVENTION

An objective of the present invention is to provide a method for leaching mixed wolframite and scheelite ore with low consumption of leaching agents, by which tungsten in the ore enters the leachate in the form of tungstate and calcium, iron and manganese in the ore stay in the residue in the form of insoluble compound precipitates, so as to realize the low-consumption and high-efficiency decomposition of the mixed wolframite and scheelite ore and develop a new process for treating mixed wolframite and scheelite ore with a short route and at low cost. The method for decomposing mixed wolframite and scheelite ore in an alkaline system provided by the present invention specifically includes steps of:

(1) grinding mixed wolframite and scheelite ore to below 30 meshes;

(2) putting the grinded mixed wolframite and scheelite ore into an autoclave, and adding sodium phosphate, sodium hydroxide, calcium fluoride and water for synergistic decomposition; and (3) treating, by solid-liquid separation, the decomposed slurry to obtain filtrate as a crude sodium tungstate solution.

Further, the decomposition temperature in the step (2) is 150° C. to 200° C.

Further, the decomposition time in the step (2) is 1.5 h to 3 h.

Further, the liquid-to-solid ratio in the reaction in the step (2) is 3:1 to 5:1 ml/g.

Further, the stirring speed in the reaction in the step (2) is 200 to 350 r/min.

Further, in the step (2), the consumption of sodium phosphate is 1.3 to 2.0 times of the theoretical amount required to decompose scheelite in the mixed wolframite and scheelite ore, the consumption of calcium fluoride is 1.2 to 2.0 times of the theoretical amount required to decompose scheelite in the mixed wolframite and scheelite ore, and the consumption of sodium hydroxide is 1.2 to 1.5 times of the theoretical amount required to decompose wolframite in the mixed wolframite and scheelite ore.

The reaction formula in the present invention is as follows:

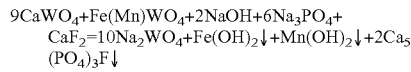

The present invention has the following advantages. By collaboratively leaching the mixed wolframite and scheelite ore by the novel leaching agents, i.e., sodium phosphate, sodium hydroxide and calcium fluoride, compared with the existing processes for leaching mixed wolframite and scheelite ore by sodium hydroxide or sodium carbonate, the consumption of the leaching agent is greatly reduced, and the tungsten decomposition rate is improved to above 94%. Thus, the high-efficiency decomposition of mixed wolframite and scheelite ore is realized with low consumption of leaching agents.

DETAILED DESCRIPTION OF THE PRESENT INVENTION

The present invention will be further described below by embodiments, and the description is not intended to limit the scope of the present invention.

Comparison Embodiment 1

150 g of mixed wolframite and scheelite ore (containing 45.8% of $WO_3$, where the ratio of scheelite to wolframite is about 3:2) was weighed, then added with sodium phosphate in an amount that is 1.5 times of the theoretical amount required to decompose scheelite and sodium hydroxide in an amount that is 1.4 times of the theoretical amount required to decompose wolframite, and added with 600 ml of water at a liquid-to-solid ratio of 3:1. The mixture was reacted for 3.0 h at 180° C. and at a stirring speed of 250 r/min and then filtrated to obtain leachate and residue. By analysis, the tungsten leaching rate was 92.84%.

Embodiment 1

200 g of mixed wolframite and scheelite ore (containing 45.8% of $WO_3$, where the ratio of scheelite to wolframite is about 3:2) was weighed, then added with sodium phosphate in an amount that is 1.3 times of the theoretical amount and calcium fluoride in an amount that is 1.2 times of the theoretical amount both required to decompose scheelite and sodium hydroxide in an amount that is 1.4 times of the theoretical amount required to decompose wolframite, and added with 600 ml of water at a liquid-to-solid ratio of 3:1. The mixture was reacted for 3.0 h at 150° C. and at a stirring speed of 250 r/min and then filtrated to obtain leachate and residue. By analysis, the tungsten leaching rate was 94.63%.

Embodiment 2

150 g of mixed wolframite and scheelite ore (containing 64.3% of $WO_3$, where the ratio of scheelite to wolframite is about 7:3) was weighed, then added with sodium phosphate in an amount that is 1.5 times of the theoretical amount and calcium fluoride in an amount that is 1.8 times of the theoretical amount both required to decompose scheelite and sodium hydroxide in an amount that is 1.2 times of the theoretical amount required to decompose wolframite, and added with 600 ml of water at a liquid-to-solid ratio of 4:1. The mixture was reacted for 2.0 h at 180° C. and at a stirring speed of 350 r/min and then filtrated to obtain leachate and residue. By analysis, the tungsten leaching rate was 98.21%.

Embodiment 3

180 g of mixed wolframite and scheelite ore (containing 53.6% of $WO_3$, where the ratio of scheelite to wolframite is about 1:1) was weighed, then added with sodium phosphate in an amount that is 1.8 times of the theoretical amount and calcium fluoride in an amount that is 1.8 times of the theoretical amount both required to decompose scheelite and sodium hydroxide in an amount that is 1.3 times of the theoretical amount required to decompose wolframite, and added with 540 ml of water at a liquid-to-solid ratio of 3:1. The mixture was reacted for 2.0 h at 190° C. and at a stirring speed of 300 r/min and then filtrated at the end of decomposition to obtain leachate and residue. By analysis, the tungsten leaching rate was 98.43%.

Embodiment 4

120 g of mixed wolframite and scheelite ore (containing 31.4% of $WO_3$, where the ratio of scheelite to wolframite is about 3:7) was weighed, then added with sodium phosphate in an amount that is 1.8 times of the theoretical amount and calcium fluoride in an amount that is 2.0 times of the theoretical amount both required to decompose scheelite and sodium hydroxide in an amount that is 1.2 times of the theoretical amount required to decompose wolframite, and added with 360 ml of water at a liquid-to-solid ratio of 3:1. The mixture was reacted for 1.5 h at 200° C. and at a stirring speed of 250 r/min and then filtrated at the end of reaction to obtain leachate and residue. By analysis, the tungsten leaching rate was 97.62%.

Embodiment 5

180 g of mixed wolframite and scheelite ore (containing 24.7% of $WO_3$, where the ratio of scheelite to wolframite is about 7:3) was weighed, then added with sodium phosphate in an amount that is 2.0 times of the theoretical amount and calcium fluoride in an amount that is 2 times of the theoretical amount both required to decompose scheelite and sodium hydroxide in an amount that is 1.5 times of the theoretical amount required to decompose wolframite, and added with 720 ml of water at a liquid-to-solid ratio of 4:1.

The mixture was reacted for 2.5 h at 190° C. and at a stirring speed of 300 r/min and then filtrated to obtain leachate and residue. By analysis, the tungsten leaching rate was 98.11%.

Embodiment 6

120 g of mixed wolframite and scheelite ore (containing 35.3% of $WO_3$, where the ratio of scheelite to wolframite is about 3:2) was weighed, then added with sodium phosphate in an amount that is 2.0 times of the theoretical amount and calcium fluoride in an amount that is 1.8 times of the theoretical amount both required to decompose scheelite and sodium hydroxide in an amount that is 1.4 times of the theoretical amount required to decompose wolframite, and added with 600 ml of water at a liquid-to-solid ratio of 5:1. The mixture was reacted for 2.0 h at 200° C. and at a stirring speed of 300 r/min and then filtrated to obtain leachate and residue. By analysis, the tungsten leaching rate was 97.48%.

What is claimed is:

1. A method for decomposing mixed wolframite and scheelite ore in an alkaline system, comprising steps of:
   (1) grinding mixed wolframite and scheelite ore to below 30 meshes;
   (2) putting the ground mixed wolframite and scheelite ore into an autoclave, and adding sodium phosphate, sodium hydroxide, calcium fluoride and water followed by stirring for synergistic decomposition such that a decomposed slurry is obtained; and
   (3) treating, by solid-liquid separation, the decomposed slurry to obtain filtrate as crude sodium tungstate solution.

2. The method according to claim 1, wherein a temperature for the synergistic decomposition in the step (2) is 150° C. to 200° C.

3. The method according to claim 1, wherein a time for the synergistic decomposition in the step (2) is 1.5 h to 3 h.

4. The method according to claim 1, wherein a liquid-to-solid ratio in the reaction in the step (2) is 3:1 to 5:1 ml/g.

5. The method according to claim 1, wherein a stirring speed in the reaction in the step (2) is 200 to 350 r/min.

6. The method according to claim 1, wherein, in the step (2), the consumption of sodium phosphate is 1.3 to 2.0 times of the theoretical amount required to decompose scheelite in the mixed wolframite and scheelite ore, the consumption of calcium fluoride is 1.2 to 2.0 times of the theoretical amount required to decompose scheelite in the mixed wolframite and scheelite ore, and the consumption of sodium hydroxide is 1.2 to 1.5 times of the theoretical amount required to decompose wolframite in the mixed wolframite and scheelite ore.

* * * * *